US010977749B2

(12) United States Patent
Widner et al.

(10) Patent No.: US 10,977,749 B2
(45) Date of Patent: Apr. 13, 2021

(54) SYSTEM AND METHOD FOR TRACKING A BOX AND CORRELATING A QUALITY CHARACTERISTIC OF THE BOX TO AN OVERALL EQUIPMENT EFFECTIVENESS OF A PACKAGING LINE THAT MANIPULATES THE BOX DURING A PRODUCT PACKAGING PROCESS

(71) Applicant: Georgia-Pacific Corrugated LLC, Atlanta, GA (US)

(72) Inventors: Ernest Barfield Widner, Flowery Branch, GA (US); Michael T. Payne, Sandy Springs, GA (US)

(73) Assignee: Georgia-Pacific Corrugated LLC, Atlanta, GA (US)

( * ) Notice: Subject to any disclaimer, the term of this patent is extended or adjusted under 35 U.S.C. 154(b) by 386 days.

(21) Appl. No.: 15/147,552

(22) Filed: May 5, 2016

(65) Prior Publication Data
US 2017/0323400 A1 Nov. 9, 2017

(51) Int. Cl.
| | |
|---|---|
| G06Q 50/04 | (2012.01) |
| G05B 19/418 | (2006.01) |
| G06F 17/18 | (2006.01) |
| G06Q 10/06 | (2012.01) |
| B65B 65/00 | (2006.01) |

(52) U.S. Cl.
CPC .......... *G06Q 50/04* (2013.01); *G05B 19/418* (2013.01); *G05B 19/41875* (2013.01); *G06F 17/18* (2013.01); *G06Q 10/06395* (2013.01); *B65B 65/003* (2013.01); *Y02P 90/30* (2015.11)

(58) Field of Classification Search
USPC ........................................................ 705/7.41
See application file for complete search history.

(56) References Cited

U.S. PATENT DOCUMENTS

| | | | | |
|---|---|---|---|---|
| 4,972,494 | A | * 11/1990 | White ..................... | B65B 19/28 209/535 |
| 5,035,683 | A | * 7/1991 | Takeda .................... | B31B 50/00 493/178 |

(Continued)

OTHER PUBLICATIONS

Yan, Research on the quick proofing process of carton, IEEE, 2010 (Year: 2010).*

(Continued)

*Primary Examiner* — Charles Guiliano
*Assistant Examiner* — Po Han Lee

(57) ABSTRACT

A method of tracking a box and correlating a quality characteristic of the box to an overall equipment effectiveness of a packaging line that manipulates the box during a product packaging process includes: at a location, associating a unique identifier with a pre-erected form of the box, capturing at least one quality characteristic of the box, and storing the at least one quality characteristic and the associated unique identifier in a database; moving the pre-erected form of the box to another location; at the another location, converting the pre-erected form of the box into an erected box, manipulating the erected box through the packaging line, and in an event where the erected box is involved in a disruption in the packaging line correlating the unique identifier of the associated erected box with the associated disruption and saving a record of the disruption and the unique identifier in a storage medium.

9 Claims, 2 Drawing Sheets

(56) References Cited

U.S. PATENT DOCUMENTS

| | | | | |
|---|---|---|---|---|
| 5,212,656 | A * | 5/1993 | Clary | G01B 11/04 |
| | | | | 493/12 |
| 7,171,283 | B2 * | 1/2007 | Popp | G05B 19/042 |
| | | | | 700/121 |
| 7,379,782 | B1 * | 5/2008 | Cocco | G06Q 10/06 |
| | | | | 700/103 |
| 7,574,447 | B2 | 8/2009 | Cornelius | |
| 7,707,008 | B1 | 4/2010 | Champlin et al. | |
| 8,073,239 | B1 * | 12/2011 | Bahrami | G06T 7/001 |
| | | | | 382/143 |
| 8,086,344 | B1 * | 12/2011 | Mishra | G06Q 30/0283 |
| | | | | 700/214 |
| 2009/0322478 | A1 | 12/2009 | Walther et al. | |
| 2010/0082151 | A1 * | 4/2010 | Young | G06Q 10/08 |
| | | | | 700/226 |
| 2010/0153220 | A1 | 6/2010 | Hamm | |
| 2017/0348940 | A1 * | 12/2017 | Amoros | B31B 50/81 |
| 2019/0002147 | A1 | 1/2019 | Scarabelli et al. | |
| 2020/0198143 | A1 | 6/2020 | Hill et al. | |
| 2020/0198280 | A1 | 6/2020 | Hill et al. | |
| 2020/0198281 | A1 | 6/2020 | Hill et al. | |

OTHER PUBLICATIONS

Notification of Transmittal of the International Search Report and the Written Opinion of the International Searching Authority, or the Declaration of the International Application No. PCT/US2017/030778 date of Completion Aug. 14, 2017; dated Aug. 14, 2017, which is related to U.S. Appl. No. 15/147,552; 11 pages.

* cited by examiner

SYSTEM AND METHOD FOR TRACKING A BOX AND CORRELATING A QUALITY CHARACTERISTIC OF THE BOX TO AN OVERALL EQUIPMENT EFFECTIVENESS OF A PACKAGING LINE THAT MANIPULATES THE BOX DURING A PRODUCT PACKAGING PROCESS

BACKGROUND OF THE INVENTION

The present disclosure relates generally to a system and method for tracking a box, and particularly to a system and method for tracking a box and correlating a quality characteristic of the box to an overall equipment effectiveness of a packaging line that manipulates the box during a product packaging process.

A tracking system and method for an inbound package is described in U.S. Pat. No. 7,574,447, which is assigned to United Parcel Service of America, Inc. Another package tracking system includes a system used by the United States Postal Service.

While existing package tracking systems may be suitable for their intended purpose, the art relating to package tracking would be advanced with a system and method for tracking a box and correlating a quality characteristic of the box to an overall equipment effectiveness of a packaging line that manipulates the box during a product packaging process.

This background information is provided to reveal information believed by the applicant to be of possible relevance to the present invention. No admission is intended, nor should be construed, that any of the preceding information constitutes prior art against the present invention.

BRIEF DESCRIPTION OF THE INVENTION

An embodiment of the invention includes a method of tracking a box and correlating a quality characteristic of the box to an overall equipment effectiveness of a packaging line that manipulates the box during a product packaging process. The method includes: at a first location, associating a unique identifier with a pre-erected form of the box, capturing at least one quality characteristic of the box, and storing the at least one quality characteristic and the associated unique identifier in a database; moving the pre-erected form of the box to a second location; at the second location, converting the pre-erected form of the box into an erected box, manipulating the erected box through the packaging line, and in an event where the erected box is involved in a disruption in the packaging line correlating the unique identifier of the associated erected box with the associated disruption and saving a record of the disruption and the unique identifier in a storage medium.

Another embodiment of the invention includes a system for tracking a box and correlating a quality characteristic of the box to an overall equipment effectiveness of a packaging line that manipulates the box during a product packaging process. The system includes: an applicator disposed and configured to apply a unique identifier to a pre-erected form of the box, the unique identifier being associated with at least one quality characteristic of the box; a first reader disposed and configured to read the applied unique identifier; a database disposed and configured to store the read unique identifier and the associated at least one quality characteristic; a converter disposed and configured to convert the pre-erected form of the box into an erected box; a second reader disposed and configured to read the unique identifier of the associated erected box; a material handler disposed and configured to manipulate the erected box through the packaging line; and, a first processing circuit responsive to executable instructions which when executed by the first processing circuit, and in an event where the erected box is involved in a disruption in the packaging line, correlates the captured unique identifier of the associated erected box with the associated disruption and saves a record of the disruption and the unique identifier in a storage medium.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following example embodiments of the invention are set forth without any loss of generality to, and without imposing limitations upon, the claimed invention.

An embodiment of the invention, as shown and described by the various figures and accompanying text, provides a system and method for tracking a box and correlating a quality characteristic of the box to an overall equipment effectiveness (OEE) of a packaging line that manipulates the box during a product packaging process. While an embodiment described herein depicts a box as an exemplary object undergoing a product packaging process where a plurality of individual products are packaged within the box, it will be appreciated that the disclosed invention is also applicable to other packaged objects, such as a bottle in a bottling plant, or a container on a container filling line, for example.

Figure 1:
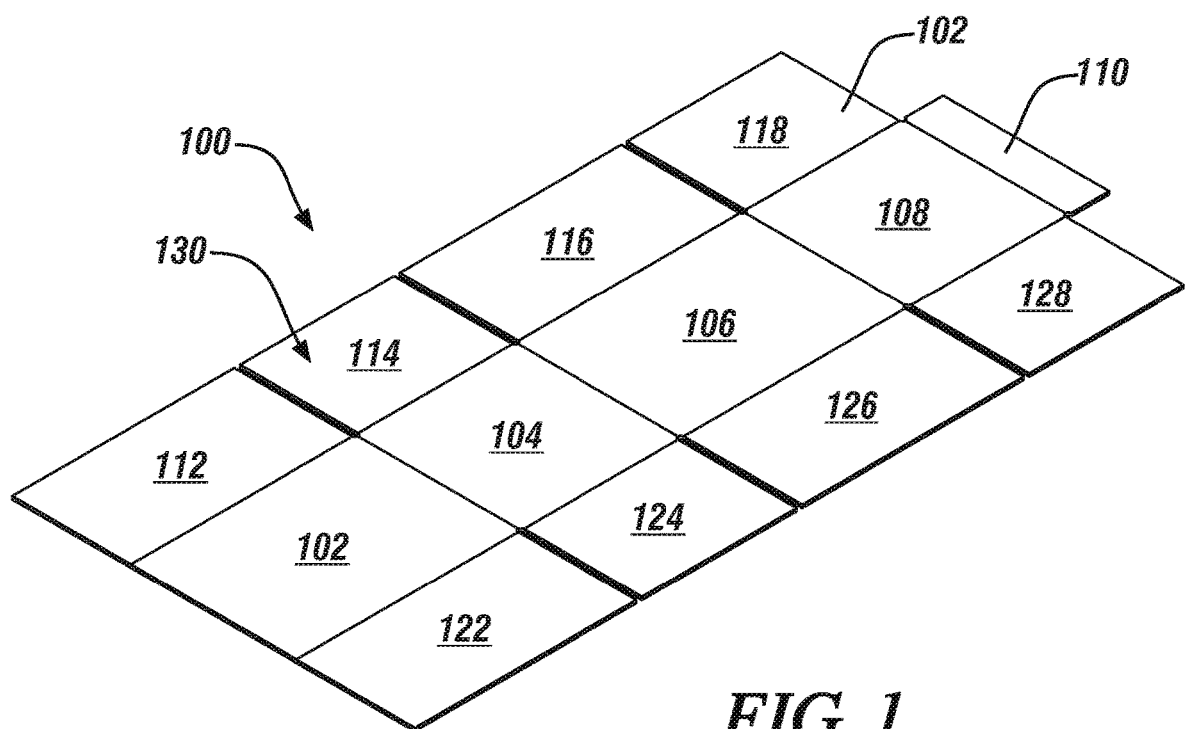
FIG. 1 depicts a flat blank for an example box for use in accordance with an embodiment of the invention.
Figure 2:
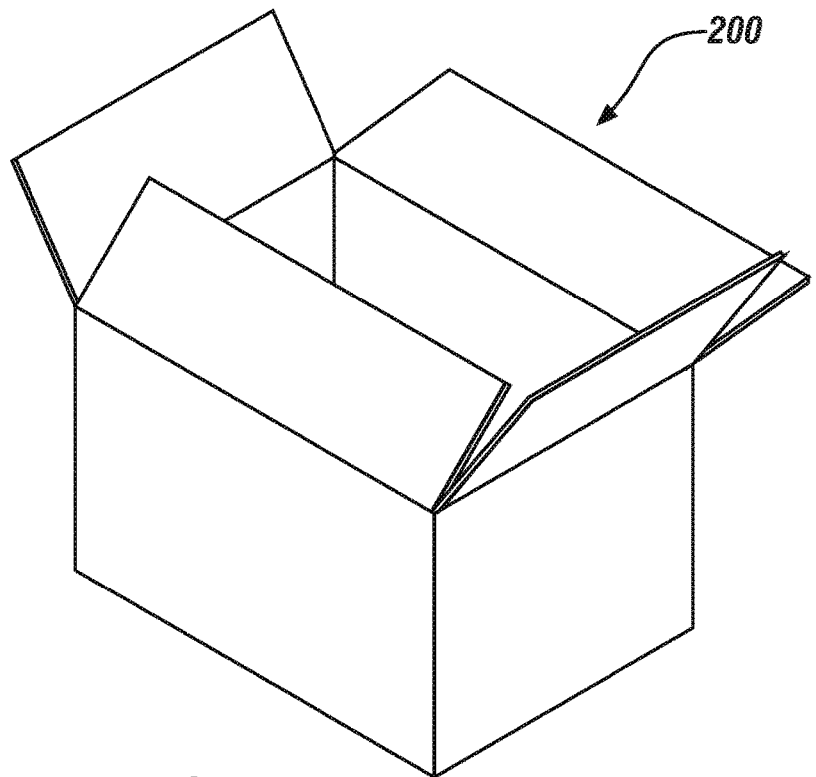
FIG. 2 depicts an erected box of the flat blank of FIG. 1 for use in accordance with an embodiment of the invention.

Reference is now made to FIG. 1, which is an example embodiment of a flat blank 100 for a to-be-erected corrugated cardboard box 200 (best seen with reference to the erected box 200 depicted in FIG. 2). While an embodiment of the box 200 is described herein being fabricated from corrugated cardboard, it will be appreciated that the scope of the invention is not so limited, and may extend to any other material suitable for a purpose disclosed herein, such as plastic for example. Any and all such materials are herein contemplated and considered to be within the scope of the invention disclosed herein.

In an embodiment, the flat blank 100 comprises a plurality of integrally formed central panels 102, 104, 106, 108, and a plurality of integrally formed side panels 112, 114, 116, 118, 122, 124, 126 and 128. Slots 130 are cut between adjacent ones of the plurality of side panels to facilitate folding and erecting of the erected box 200 (see FIG. 2). An integrally formed glue tab 110 is provided for creating a manufacturer's joint of a folded and glued, or otherwise adhered, knockdown (KD) box form 300, which is more generally herein referred to as a pre-erected box form 300, which is best seen with reference to FIG. 3.

While example embodiments presented herein describe and illustrate a KD box form as an example pre-erected box form, it will be appreciated that the scope of the invention is not so limited and encompasses other pre-erected box forms, such as a blank, a flat, or a wrapped blank or flat, for example. And while example embodiments presented herein describe and illustrate a flat blank for a regular slotted container (RSC), it will be appreciated that the scope of the invention is not so limited and encompasses other types of containers, such as a wrapped box, for example.

Figure 3:
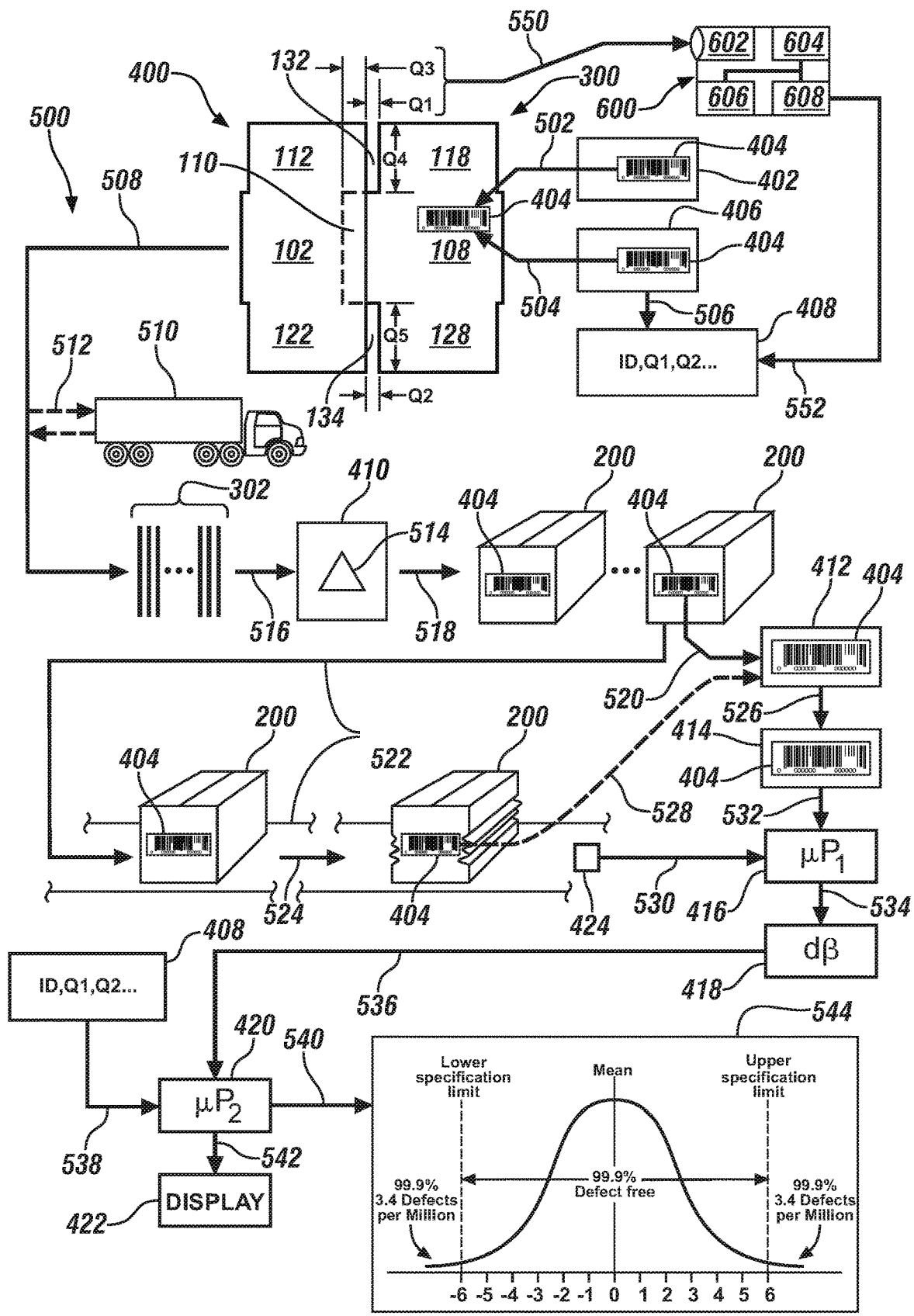
FIG. 3 depicts a system and method for tracking the box of FIG. 2 and correlating a quality characteristic of the box to an overall equipment effectiveness of a packaging line that manipulates the box during a product packaging process, in accordance with an embodiment of the invention.

Viewing FIGS. 1-3 in combination, an embodiment of the erected box 200 begins as the flat blank 100. The left three panels 102, 112, 122 are folded onto the respective adjacent panels 104, 114, 124, and the right three panels 108, 118, 128 are folded onto the respective adjacent panels 106, 116, 126. The glue tab 110 is disposed underneath the central panel 102 so that it is not visible from the outside of the erected box 200. The end result is the pre-erected box form 300 depicted in FIG. 3, where panels 104, 106, 114, 116, 124 and 126 are hidden from view, and the folded panels lie flat. The erected box 200 is completed by further folding and adhering of the plurality of panels in a manner known in the art and requiring no further discussion here, and which is depicted in FIG. 2.

In an example supplier-customer arrangement, the flat blank 100 and pre-erected box form 300 are fabricated at a first location, such as the supplier's fabrication location for example, and the erected box 200 is erected at a second location, such as the customer's packaging line location for example, at which second location individual products are packaged within the erected box 200.

Reference is now made to FIG. 3, which depicts a system 400 and a method 500 for tracking a box and correlating a quality characteristic of the box to an overall equipment effectiveness of a packaging line that manipulates the box during a product packaging process.

In an embodiment, the system 400 includes an applicator 402 disposed and configured to apply 502 a unique identifier 404 to the pre-erected box form 300, the unique identifier 404 being associated with at least one quality characteristic, Q1-Q6, for example, of the pre-erected box form 300. In embodiment, Q1 is the width of the slot (gap) 132 (also herein referred to as a lead gap dimension of a lead slot), Q2 is the width of the slot (gap) 134 (also herein referred to as a trail gap dimension of a trail slot), Q3 is the overlap dimension of the glue joint associated with glue tab 110 (also herein referred to as a manufactured joint overlap dimension), Q4 is the depth of the slot 132 (also herein referred to as a lead slot depth dimension), Q5 is the depth of the slot 134 (also herein referred to as a trail slot depth dimension), and Q6, also herein referred to as the skew or a representative skew dimension, is provided by the following equation:

$$\text{Skew}(Q6) = [\text{gap } 132(Q1)] - [\text{gap } 134(Q2)].$$

While an embodiment of the invention is disclosed herein having at least one quality characteristic Q1-Q6, it will be appreciated that the scope of the invention is not limited to only those Q1-Q6 quality characteristics disclosed herein, but encompasses any and all other quality characteristics that may have statistical significance in determining an overall equipment effectiveness value for a purpose disclosed herein. Example additional quality characteristics may include but are not limited to: a height, width, or depth, of the erected box 200, a panel thickness of the erected box 200, and a compression strength of the erected box 200, for example. Other example quality characteristics may include an image of the pre-erected box form 300 and/or an image of the erected box 200.

While reference is made in an example embodiment disclosed herein to quality characteristics Q1-Q6 of a pre-erected box form 300, it will be appreciated from the foregoing description that the scope of the invention is not so limited, and also encompasses quality characteristics of an erected box 200.

In an embodiment, the unique identifier 404 may be any one of a one-dimensional bar code, a two-dimensional bar code, a serial number, or a product identifier number, for example, or any other identification feature suitable for a purpose disclosed herein, and may be embodied in any suitable form, such as an adhered label, a printing, or a laser etching, for example. While certain forms of the unique identifier 404 are disclosed herein, it will be appreciated that the scope of the invention is not so limited, and encompasses any form suitable for a purpose disclosed herein.

A first reader 406, such as a bar code optical scanner or a radio frequency (RF) reader for example, or any other reading device suitable for a purpose disclosed herein, is disposed and configured to read 504 the applied unique identifier 404, and a first database 408 is disposed and configured to store 506 the read unique identifier 404 and the associated at least one quality characteristic Q1-Q6. The first database 408 may be incorporated into the first reader 406, or may be a standalone storage medium that the first reader 406 is in signal communication with, such as for example via wireless communication (also referred to by reference numeral 506). The unique identifier 404 for each pre-erected box form 300, along with its associated quality characteristics Q1-Q6, are saved in the first database 408 for subsequent processing, which is discussed further below.

In an embodiment, the quality characteristics Q1-Q6 are captured using any method suitable for a purpose disclosed herein, such as manual entry, or a vision system (VS) 600 having, for example, an imager 602 (such as a camera, 2D scanner, 3D scanner, or laser scanner, for example), a VS processing circuit 604, a VS database 606, and an optional VS communication port 608, where the imager 602 captures 550 one or more images of the quality characteristics under consideration, the VS processing circuit 604 responsive to executable instructions which when executed by the VS processing circuit 604 analyzes the one or more images and associates a number or value to the respective quality characteristic, saves the number/value in the VS database 606, and communicates 552 the collective quality characteristics Q1-Q6 to the first database 408 wirelessly or via the optional VS communication port 608. Such vision systems 600 are well known in the art and therefore require no further detailed description herein.

Via method 500, the pre-erected box form 300 is moved or transported 508 from a first location to a second location. In an embodiment, a transporter 510 is optionally disposed and configured to transport 512 the pre-erected box form 300 from the first location to the second location. More practically, the transporter 510 is configured to transport 512 a plurality of pre-erected box forms 302. The transporter 510 may be of any form suitable for a purpose disclosed herein, and in an embodiment is a tractor trailer, for example. FIG. 3 depicts the plurality of pre-erected box forms 302 as flat panels arranged edgewise.

As described in this example, the terms first location and second location refer to a first location of a supplier of the pre-erected box form 300, and to a second location of a customer of the pre-erected box form 300 that purchases, utilizes and converts the pre-erected box form 300 into an erected box 200 for use on their packaging line (discussed further below), where the second location is remote from the first location. In such a scenario, the transporter 510 (tractor trailer, for example) would be utilized for efficiently transporting the plurality of pre-erected box forms 302 from the supplier to the customer. However, it is also contemplated that an embodiment of the invention also encompasses a first location and a second location that exist within a given packaging complex, albeit at different physical locations within the complex, that serves as both a fabricator and a utilizer of the pre-erected box form 300 for product packaging. In this scenario, the transporter 510 may simply be a mechanical material handler, such as a push-cart for example, or any other suitable apparatus for moving a plurality of pre-erected box forms 302 from a first physical location to a second physical location within the same packaging complex. As such, the terms first location and second location could be any two locations, anywhere, where the pre-erected box form 300 at the first location is relocated to the second location and converted to an erected box 200. As also described in this example, the terms supplier and customer may be individuals, employees or entities associated with different companies, businesses or entities, or may be individuals, employees or entities associated with the same company, business or entity.

With reference still to FIG. 3, a converter 410 is disposed and configured to convert 514 the pre-erected box form 300 into an erected box 200, which has the unique identifier 404 readily readable. Processing equipment, not specifically shown, moves 516, 518 the pre-erected box form 300 and the erected box 200 through the converter 410.

A second reader 412, such as a bar code optical scanner or an RF reader for example, or any other reading device suitable for a purpose disclosed herein, is disposed and configured to read 520 the unique identifier 404 of the associated erected box 200. In a first embodiment, the second reader 412 is disposed to read 520 the unique identifier 404 of the associated erected box 200 prior to a material handler 522 manipulating the erected box 200 through the packaging line 524, and is configured to save 526 the unique identifier 404 of the associated erected box 200 to a storage medium 414. In a second embodiment, the second reader 412 is disposed to read 528 the unique identifier 404 of the associated erected box 202 in response to a disruption event 202 (depicted as a partially crushed or otherwise damaged box 202), and is configured to save 526 the unique identifier 404 of the associated damaged box 202 to a storage medium 414. As used herein, the term disruption event includes any event that may jam, or reduce the overall equipment effectiveness, or line efficiency, of the erected box 200 in the packaging line 524, which may include a damaged box that could jam or slow down the packaging line, or a perceived problem that may or may not be box related, such as equipment control parameters falling outside of specification and causing the packaging line to run too fast or too slow for example. As such, a disruption event is intended to include any event that may have an undesirable impact on the overall equipment effectiveness.

A disruption event 202 may be attributed to one or more quality characteristics Q1-Q6 being out of specification, or being set towards an upper or a lower limit of a design specification, or may be attributed to one or more setup parameters of the packaging equipment being out of specification, or being set or having drifted towards an upper or a lower limit of a desired specification. The disruption event 202 may be attributed to a quality characteristic associated with the erected box 200, or with the pre-erected box form 300.

A first processing circuit 416 responsive to a first set of executable instructions which when executed by the first processing circuit 416, and in an event where the erected box 200 is involved in a disruption event 202 in the packaging line 524, receives 530 information regarding the disruption event 202, via operator input or an equipment sensor 424 for example, and receives 532 information regarding the associated unique identifier 404 of the damaged box 202, via scanning (or other suitable entry, such as manual entry for example) of the unique identifier 404 for example, correlates the read unique identifier 404 of the associated erected box 200 with the associated disruption event 202 by associating the read unique identifier 404 of the erected box 200 involved in the disruption event 202 with a time stamp of the disruption event 202, and saves 534 a record of the disruption event 202 and the unique identifier 404 in a storage medium or second database 418 for subsequent processing. In an embodiment, the equipment sensor 424 is disposed and configured to sense movement of the erected box 200 in the packaging line 524, and in the event of a disruption event 202 where the erected box 200 may jam or slow down, sends a signal 530 to the first processing circuit 416 that contains such information, along with a time stamp of the disruption event 202. Other sensing means suitable for a purpose disclosed herein may be employed in place of or in addition to sensor 424.

A second processing circuit 420 responsive to a second set of executable instructions which when executed by the second processing circuit 420, and in the event where the erected box 200 is involved in a disruption event 202 in the packaging line 524, receives 536 information regarding the saved record 418 of the disruption event 202, receives 538 information regarding the associated unique identifier 404 and the at least one quality characteristic Q1-Q6 stored in the first database 408, analyzes the stored at least one quality characteristic Q1-Q6 of the correlated unique identifier 404 of the associated erected box 202, determines 540 whether one or more of the at least one quality characteristic Q1-Q6 had an impact on the overall equipment effectiveness of the packaging line 524, and outputs 542 to a display 422 information regarding the overall equipment effectiveness. In an embodiment, the second processing circuit 420 utilizes a statistical analysis methodology or algorithm 544, employing six sigma practices for example, along with historical data in databases 408 and 418, to make the determination 540 whether one or more of the at least one quality characteristic Q1-Q6 had an impact on the overall equipment effectiveness of the packaging line 524. For example, the second processing circuit 420 is responsive to the executable instructions to determine whether the one or more of the at least one quality characteristic Q1-Q6 had an impact on the overall equipment effectiveness of the packaging line by employing the statistical analysis methodology/algorithm 544 to compare information of a given disruption event 202 with historical data in databases 408 and 418 relating to the at least one quality characteristic Q1-Q6. For example, if a statistical analysis of one or more of the quality characteristics Q1-Q6, via the statistical analysis methodology/algorithm 544, indicates that the one or more of the quality characteristics Q1-Q6 of interest are within predefined specifications (e.g., meet predefined quality standards), and the historical data in database 408 and/or 418 indicates an absence of any disruption event 202 with such one or more of the quality characteristic Q1-Q6 being within the predefined specifications, then it may be considered that the erected box 200, or pre-erected box form 300, itself was not the root cause of the disruption event 202. However, if on the other hand it is found that one or more of the quality characteristics Q1-Q6 falls outside of the predefined specifications, then a contrary determination may be made.

By employing a system 400 and method 500 as disclosed herein, a supplier of a pre-erected box form 300 and a customer that utilizes an erected box 200 of the pre-erected box form 300 can work together to analyze and improve the overall equipment effectiveness of all equipment involved in the fabrication and packaging process by understanding if and how manufacturing variations of box quality characteristics, or packaging equipment variation of setup parameters, may impact the overall equipment effectiveness. One end goal of employing the system 400 and method 500 is to improve process throughput. Another benefit contemplated by employing the system 400 and method 500 is the identification of those quality characteristics that have little or no statistical significance with respect to a disruption event or throughput.

From the foregoing description, it will be appreciated that an embodiment of the invention includes the method 500, which encompasses tracking a box 200 and correlating a quality characteristic Q1-Q6 of the box to an overall equipment effectiveness of a packaging line 524 that manipulates the box 200 during a product packaging process (also referred to by reference numeral 524). In an embodiment, the method comprises: at a first location, associating a unique identifier 404 with a pre-erected form of the box 300, capturing 550 at least one quality characteristic Q1-Q6 of the pre-erected form of the box 300, and storing 552, 506 the at least one quality characteristic and the associated unique identifier in a database 408; moving 508 the pre-erected form of the box to a second location; at the second location, converting 514 the pre-erected form of the box 300 into an erected box 200, manipulating 522 the erected box 200 through the packaging line 524, and in an event where the erected box 200 is involved in a disruption 202 in the packaging line 524 correlating via processing circuit 416 the unique identifier of the associated erected box with the associated disruption and saving 534 a record of the disruption and the unique identifier in a storage medium 418.

In an embodiment, the method 500 further comprises; in the event where the erected box 200 is involved in a disruption 202 in the packaging line 524, retrieving 536 the saved record of the disruption from storage medium 418, analyzing 540 the stored at least one quality characteristic of the correlated unique identifier of the associated erected box, and determining whether one or more of the at least one quality characteristic had an impact on the overall equipment effectiveness of the packaging line 524.

An embodiment of the invention may be embodied in the form of one or more computer-implemented processes and apparatuses for practicing those processes. The present invention may also be embodied in the form of one or more computer program products having computer program code containing instructions embodied in tangible media, such as floppy diskettes, CD-ROMs, hard drives, USB (universal serial bus) drives, or any other computer readable storage medium, such as random access memory (RAM), read only memory (ROM), erasable programmable read only memory (EPROM), electrically erasable programmable read only memory (EEPROM), or flash memory, for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to track a box and correlate a quality characteristic of the box to an overall equipment effectiveness of a packaging line that manipulates the box during a product packaging process.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims. Also, in the drawings and the description, there have been disclosed example embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of tracking a box and correlating a quality characteristic associated with the box to an overall equipment effectiveness of a product packaging line that manipulates the box during a product packaging process, the method comprising:

at a first location, associating a unique identifier with a pre-erected form of the box, capturing at least one quality characteristic of the pre-erected form of the box, and storing the at least one quality characteristic and the associated unique identifier in a database;

moving the pre-erected form of the box to a second location;

at the second location, converting the pre-erected form of the box into an erected box, capturing and storing at least one quality characteristic of the erected box in the database, manipulating the erected box through the product packaging line, and determining that the erected box is involved in a disruption in the product packaging line;

in response to determining the erected box is involved in a disruption in the product packaging line, correlating the unique identifier of the associated erected box with the associated disruption and saving a record of the disruption and the unique identifier in a storage medium; and in response to determining the erected box is involved in the disruption in the product packaging line, signaling a disruption event that is an event that reduces line efficiency of the product packaging line, retrieving the saved record of the disruption from the storage medium, analyzing the stored at least one quality characteristic of the pre-erected form of the box or the at least one quality characteristic of the erected box correlated with the unique identifier of the associated erected box via a processing circuit responsive to executable instruction which when executed on the processing circuit executes a statistical analysis, and determining via the statistical analysis executed via the processing circuit that the pre-erected form of the box or the erected box was a root cause of the disruption event, and that one or more of the at least one quality characteristic of the pre-erected form of the box or the erected box had an impact on the overall equipment effectiveness of the product packaging line.

2. The method of claim 1, wherein:
the at least one quality characteristic of the pre-erected form of the box comprises one or more of: a lead gap dimension of a lead slot; a trail gap dimension of a trail slot; a lead slot depth dimension; a trail slot depth dimension; a representative skew dimension; and, a manufactured joint overlap dimension.

3. The method of claim 1, wherein:
prior to manipulating the erected box through the product packaging line, capturing and saving the unique identifier of the associated erected box to a storage medium.

4. The method of claim 1, wherein:
in addition to a disruption event, reading and saving the unique identifier of the associated erected box to a storage medium.

5. The method of claim 1, wherein the unique identifier comprises one or more of:
a one-dimensional bar code; a two-dimensional bar code; a serial number; a product identifier number.

6. The method of claim 1, wherein the unique identifier is applied to the box via: an adhered label; printing; or, laser etching.

7. The method of claim 1, wherein:
the disruption event is associated with a captured quality characteristic of the pre-erected form of the box.

8. The method of claim 1, further wherein:
the disruption event is associated with any one of: a captured quality characteristic of the erected box; or a damaged one of the erected box.

9. The method of claim 1, further wherein:
the disruption event is attributed to any one of: a control parameter of the equipment of the product packaging line that falls outside of a defined specification; or, a setup parameter of the equipment of the product packaging line that falls outside of or drifts towards a defined specification limit.

* * * * *